US007280848B2

(12) United States Patent
Hoppenstein

(10) Patent No.: US 7,280,848 B2
(45) Date of Patent: Oct. 9, 2007

(54) ACTIVE ARRAY ANTENNA AND SYSTEM FOR BEAMFORMING

(75) Inventor: Russell Hoppenstein, Richardson, TX (US)

(73) Assignee: Andrew Corporation, Westchester, IL (US)

(*) Notice: Subject to any disclaimer, the term of this patent is extended or adjusted under 35 U.S.C. 154(b) by 620 days.

(21) Appl. No.: 10/260,797

(22) Filed: Sep. 30, 2002

(65) Prior Publication Data

US 2004/0204109 A1 Oct. 14, 2004

(51) Int. Cl.
*H04B 1/38* (2006.01)
*H04M 1/00* (2006.01)

(52) U.S. Cl. ................ 455/561; 455/562.1; 455/114.3; 455/82

(58) Field of Classification Search ............ 455/562.1, 455/561, 69, 424, 67.14, 19, 25, 507, 63.1, 455/63.4, 67.13, 82, 83, 448, 69.82, 101, 455/114.3, 129, 126, 103; 342/368, 362, 342/361, 835, 850; 375/296
See application file for complete search history.

(56) References Cited

U.S. PATENT DOCUMENTS

| | | | | |
|---|---|---|---|---|
| 4,070,637 | A | 1/1978 | Assal et al. | 333/7 R |
| 4,124,852 | A | 11/1978 | Steudel | 343/854 |
| 4,246,585 | A | 1/1981 | Mailloux | 343/854 |
| 4,360,813 | A | 11/1982 | Fitzsimmons | 343/100 R |
| 4,566,013 | A | 1/1986 | Steinberg et al. | 343/372 |
| 4,607,389 | A | 8/1986 | Halgrimson | 455/11 |
| 4,614,947 | A | 9/1986 | Rammos | 343/778 |
| 4,689,631 | A | 8/1987 | Gans et al. | 343/781 R |
| 4,825,172 | A | 4/1989 | Thompson | 330/124 R |
| 4,849,763 | A | 7/1989 | DuFort | 342/372 |
| 4,890,110 | A | 12/1989 | Kuwahara | 342/35 |
| 4,994,813 | A | 2/1991 | Shiramatsu et al. | 342/360 |

(Continued)

FOREIGN PATENT DOCUMENTS

| | | |
|---|---|---|
| CA | 2306650 | 10/2000 |

(Continued)

OTHER PUBLICATIONS

Howat, F., "Cell Like Performace Using the Remotely Controlled Cellular Transmitter", *Gateway to New Concepts in Vehicular Technology*, San Francisco, CA, May 1-3, 1989, Vehicular Technology Conference, 39th IEEE, vol. 2, pp. 535-541, XP000076080.

(Continued)

*Primary Examiner*—Edward F. Urban
*Assistant Examiner*—John J. Lee
(74) *Attorney, Agent, or Firm*—Wood, Herron & Evans, LLP

(57) ABSTRACT

An active antenna array for use in a beamforming antenna system. The antenna array includes multicarrier power amplifiers coupled to each antenna element wherein the outputs of the multicarrier power amplifiers are linearized. The antenna array communicates with a base station control unit located at the base of the cellular tower in digital baseband. Fiber optic transmission lines couple the antenna arrays with the base station control unit. Multicarrier linear power amplifiers may be coupled to the antenna elements to linearize the outputs of the antenna elements. Alternatively, a predistortion circuit is coupled to the antenna elements to linearize the outputs of the antenna elements when multicarrier power amplifiers are used.

14 Claims, 5 Drawing Sheets

U.S. PATENT DOCUMENTS

| | | | | |
|---|---|---|---|---|
| 5,034,752 | A | 7/1991 | Pourailly et al. | 342/373 |
| 5,038,150 | A | 8/1991 | Bains | 342/373 |
| 5,061,939 | A | 10/1991 | Nakase | 343/700 MS |
| 5,206,604 | A | 4/1993 | Vaninetti | 330/124 R |
| 5,230,080 | A | 7/1993 | Fabre et al. | 455/15 |
| 5,247,310 | A | 9/1993 | Waters | 342/368 |
| 5,248,980 | A | 9/1993 | Raguenet | 342/354 |
| 5,270,721 | A | 12/1993 | Tsukamoto et al. | 343/700 MS |
| 5,280,297 | A | 1/1994 | Profera, Jr. | 343/754 |
| 5,327,150 | A | 7/1994 | Cherrette | 343/771 |
| 5,355,143 | A | 10/1994 | Zurcher et al. | 343/700 MS |
| RE34,796 | E | 11/1994 | Smith et al. | 343/876 |
| 5,379,455 | A | 1/1995 | Koschek | 455/273 |
| 5,412,414 | A | 5/1995 | Ast et al. | 342/174 |
| 5,437,052 | A | 7/1995 | Hemmie et al. | 455/5.1 |
| 5,457,557 | A | 10/1995 | Zarem et al. | 359/121 |
| 5,513,176 | A | 4/1996 | Dean et al. | 370/18 |
| 5,548,813 | A | 8/1996 | Charas et al. | 455/33.3 |
| 5,554,865 | A | 9/1996 | Larson | 257/275 |
| 5,568,160 | A | 10/1996 | Collins | 343/778 |
| 5,596,329 | A | 1/1997 | Searle et al. | 342/374 |
| 5,604,462 | A | 2/1997 | Gans et al. | 330/124 R |
| 5,604,925 | A | 2/1997 | O'Malley et al. | 455/254 |
| 5,610,510 | A | 3/1997 | Boone et al. | 324/95 |
| 5,619,210 | A | 4/1997 | Dent | 342/352 |
| 5,623,269 | A | 4/1997 | Hirshfield et al. | 342/354 |
| 5,644,316 | A | 7/1997 | Lewis et al. | 342/174 |
| 5,644,622 | A | 7/1997 | Russell et al. | 455/422 |
| 5,646,631 | A | 7/1997 | Arntz | 342/373 |
| 5,657,374 | A | 8/1997 | Russell et al. | 370/328 |
| 5,659,322 | A | 8/1997 | Caille | 342/188 |
| 5,680,142 | A | 10/1997 | Smith et al. | 342/372 |
| 5,710,804 | A | 1/1998 | Bhame et al. | 379/58 |
| 5,714,957 | A | 2/1998 | Searle et al. | 342/374 |
| 5,724,666 | A | 3/1998 | Dent | 455/562 |
| 5,745,841 | A | 4/1998 | Reudink et al. | 455/62 |
| 5,751,250 | A | 5/1998 | Arntz | 342/373 |
| 5,754,139 | A | 5/1998 | Turcotte et al. | 342/373 |
| 5,758,287 | A | 5/1998 | Lee et al. | 455/450 |
| 5,770,970 | A | 6/1998 | Ikeda et al. | 330/286 |
| 5,771,017 | A | 6/1998 | Dean et al. | 342/374 |
| 5,774,666 | A | 6/1998 | Portuesi | 395/200.48 |
| 5,784,031 | A | 7/1998 | Weiss et al. | 342/373 |
| 5,790,078 | A | 8/1998 | Suzuki et al. | 343/700 MS |
| 5,802,173 | A | 9/1998 | Hamilton-Piercy et al. | 379/56.2 |
| 5,809,395 | A | 9/1998 | Hamilton-Piercy et al. | 455/4.1 |
| 5,815,115 | A | 9/1998 | Carloni et al. | 342/359 |
| 5,825,762 | A | 10/1998 | Kamin, Jr. et al. | 370/335 |
| 5,832,389 | A | 11/1998 | Dent | 455/562 |
| 5,835,128 | A | 11/1998 | Macdonald et al. | 348/8 |
| 5,854,611 | A | 12/1998 | Gans et al. | 342/373 |
| 5,856,804 | A | 1/1999 | Turcotte et al. | 342/371 |
| 5,862,459 | A | 1/1999 | Charas | 455/114 |
| 5,872,547 | A | 2/1999 | Martek | 343/815 |
| 5,878,345 | A | 3/1999 | Ray et al. | 455/431 |
| 5,880,701 | A | 3/1999 | Bhame et al. | 343/890 |
| 5,884,147 | A | 3/1999 | Reudink et al. | 455/67.1 |
| 5,889,494 | A | 3/1999 | Reudink et al. | 342/373 |
| 5,896,104 | A | 4/1999 | Komatsu et al. | 342/175 |
| 5,929,823 | A | 7/1999 | Martek et al. | 343/817 |
| 5,933,113 | A | 8/1999 | Newberg et al. | 342/375 |
| 5,936,577 | A | 8/1999 | Shoki et al. | 342/373 |
| 5,936,591 | A | 8/1999 | Yamasa et al. | 343/853 |
| 5,940,045 | A | 8/1999 | Belcher et al. | 343/850 |
| 5,949,376 | A | 9/1999 | McDonald et al. | 343/700 MS |
| 5,966,094 | A | 10/1999 | Ward et al. | 342/373 |
| 5,969,689 | A | 10/1999 | Martek et al. | 343/758 |
| 5,987,335 | A | 11/1999 | Knoedl, Jr. et al. | 455/561 |
| 6,008,763 | A | 12/1999 | Nystrom et al. | 343/700 MS |
| 6,016,123 | A | 1/2000 | Barton et al. | 342/373 |
| 6,018,643 | A | 1/2000 | Golemon et al. | 455/63 |
| 6,020,848 | A | 2/2000 | Wallace et al. | 342/362 |
| 6,037,903 | A | 3/2000 | Lange et al. | 343/700 MS |
| 6,038,459 | A | 3/2000 | Searle et al. | |
| 6,043,790 | A | 3/2000 | Derneryd et al. | 343/853 |
| 6,047,199 | A | 4/2000 | DeMarco | 455/572 |
| 6,055,230 | A | 4/2000 | Feuerstein et al. | 370/335 |
| 6,070,090 | A | 5/2000 | Feuerstein | 455/561 |
| 6,072,434 | A | 6/2000 | Papatheodorou | 343/700 MS |
| 6,091,360 | A | 7/2000 | Reits | 342/368 |
| 6,094,165 | A | 7/2000 | Smith | 342/373 |
| 6,104,935 | A | 8/2000 | Smith et al. | 455/562 |
| 6,140,976 | A | 10/2000 | Locke et al. | 343/853 |
| 6,144,652 | A | 11/2000 | Avidor et al. | 370/336 |
| 6,157,343 | A | 12/2000 | Andersson et al. | 342/371 |
| 6,160,514 | A | 12/2000 | Judd | 343/700 MS |
| 6,181,276 | B1 | 1/2001 | Schlekewey et al. | 342/372 |
| 6,188,373 | B1 | 2/2001 | Martek | 343/893 |
| 6,195,556 | B1 | 2/2001 | Reudink et al. | 455/456 |
| 6,198,434 | B1 | 3/2001 | Martek et al. | 342/373 |
| 6,198,435 | B1 | 3/2001 | Reudink et al. | 342/373 |
| 6,198,460 | B1 | 3/2001 | Brankovic | 343/879 |
| 6,201,801 | B1 | 3/2001 | Dent | |
| 6,222,503 | B1 | 4/2001 | Gietema et al. | 343/890 |
| 6,233,434 | B1 | 5/2001 | Takei | 455/103 |
| 6,233,466 | B1 | 5/2001 | Wong et al. | 455/562 |
| 6,236,849 | B1 | 5/2001 | Reudink et al. | 455/342 |
| 6,240,274 | B1 | 5/2001 | Izadpanah | 455/39 |
| 6,246,674 | B1 | 6/2001 | Feuerstein et al. | 370/334 |
| 6,266,545 | B1 | 7/2001 | Backman et al. | 455/572 |
| 6,269,255 | B1 | 7/2001 | Waylett | 455/562 |
| 6,377,558 | B1 | 4/2002 | Dent | 370/321 |
| 6,519,478 | B1 | 2/2003 | Scherzer et al. | 455/562 |
| 2002/0008577 | A1 | 1/2002 | Cova et al. | |
| 2002/0042290 | A1* | 4/2002 | Williams et al. | 455/562 |
| 2003/0032424 | A1* | 2/2003 | Judd et al. | 455/426 |
| 2003/0036410 | A1* | 2/2003 | Judd et al. | 455/561 |
| 2003/0071761 | A1* | 4/2003 | Judd | 343/853 |
| 2003/0206134 | A1* | 11/2003 | Lier et al. | 342/368 |

FOREIGN PATENT DOCUMENTS

| | | | |
|---|---|---|---|
| EP | 0 245 955 | A2 | 11/1987 |
| EP | 0 447 218 | B1 | 9/1991 |
| EP | 0 551 556 | A1 | 7/1993 |
| EP | 0 639 035 | A1 | 2/1995 |
| EP | 0 713 261 | A1 | 5/1996 |
| EP | 0 878 974 | A1 | 11/1998 |
| EP | 0 984 554 | A2 | 3/2000 |
| EP | 0 994 567 | A2 | 4/2000 |
| EP | 1 111 821 | A2 | 6/2001 |
| GB | 2 286 749 | A | 8/1995 |
| GB | 2 320 618 | A | 6/1998 |
| JP | 08-102618 | | 4/1996 |
| JP | 11-330838 | | 11/1999 |
| WO | WO 95/26116 | | 9/1995 |
| WO | WO 95/34102 | | 12/1995 |
| WO | WO 97/44914 | | 11/1997 |
| WO | WO 98/11626 | | 3/1998 |
| WO | WO 98/39851 | | 9/1998 |
| WO | WO 98/09372 | | 1/1999 |
| WO | WO 99/26317 | | 5/1999 |
| WO | WO 00/03479 | | 1/2000 |
| WO | WO 00/31824 | | 6/2000 |
| WO | WO 00/39943 | | 7/2000 |
| WO | WO 01/06801 | | 1/2001 |
| WO | WO 01/06801 | A1 * | 1/2001 |
| WO | WO 98/50981 | | 4/2001 |
| WO | WO 02/19470 | A1 * | 3/2002 |

WO WO 02/039541 A3 5/2002

OTHER PUBLICATIONS

Shibutani, Makoto et al., "Optical Fiber Feeder for Microcellular Mobile Communication Systems (H-015)", *IEEE Journal on Selected Areas in Communications*, IEEE Inc., New York, NY, vol. 11, No. 7, Sep. 1993, pp. 1118-1126, XP000400021, ISSN: 0733-8716.

Great Britain, *Patents Act 1977: Search Report Under Section 17*, Date of Search Jan. 23, 2004 (1 page).

Song, H.J. and Bialkowski, M.E., *A Multilayer Microstrip Patch Antenna Subarray Design Using CAD*, Microwave Journal, Mar. 1997, pp. 22-34 (8 pages).

Levine, E., Malamud, G., Shtrikman, S., and Treves, D., *A study Microstrip Array Antennas with the Feed Network*, IEEE Trans. Antennas Propagation, vol. 37, No. 4, Apr. 1989, pp. 426-434 (8 pages).

Herd, J.S., *Modelling of Wideband Proximity Coupled Microstrip Array Elements*, Electronic Letters, vol. 2, No. 16, Aug. 1990, pp. 1282-1284 (3 pages).

Hall, P.S., and Hall, C.M., *Coplanar Corporate Feed Effects in Microstrip Patch Array Design*, Proc. IEEE, vol. 135, pt. H, Jun. 1988, p. 180-186 (7 pages).

Zurcher, J.F., *The SSFIP: A Global Concept for High-Performance Broadband Planar Antennas*, Electronic Letters, vol. 24, No. 23, Nov. 1988, p. 1433-1435 (4 pages).

Zurcher, J.F. and Gardiol, F.E., *The SSFIP Principle: Broadband Patch Antennas*, Artech House, 1995, Chapter 3, pp. 45-60 (17 pages).

Song, H.J. and Bialkowski, M.E., *Ku-Band 16×16 Planar Array with Aperture-Coupled Microstrip-Patch Elements*, IEEE Antennas and Propagation Magazine, vol. 40, No. 5, Oct. 1998, pp. 25-29 (5 pages).

UK Patent Office, Combined Search and Examination Report Under Sections 17 and 18(3), Date of Report May 2, 2006 for Application No. GB0600515.1 (2 pages).

UK Patent Office, *Examination Report Under Section 18*(3), Date of Report Jun. 15, 2005 for Application No. GB0321886.4 (3 pages).

* cited by examiner

ACTIVE ARRAY ANTENNA AND SYSTEM FOR BEAMFORMING

FIELD OF THE INVENTION

The present invention relates generally to antennas and antenna systems used in the provision of wireless services and, more particularly, to an antenna array adapted to be mounted on a tower or other support structure for providing wireless communication services.

BACKGROUND OF THE INVENTION

Wireless communication systems are widely used to provide voice and data communication between entities and customer equipment, such as between two mobile stations or units, or between a mobile station and a land line telephone user. As illustrated in FIG. 1, a typical communication system 10 as in the prior art includes one or more mobile units 12, one or more base stations 14 and a telephone switching office 16. In the provision of wireless services within a cellular network, individual geographic areas or "cells" are serviced by one or more of the base stations 14. A typical base station 14 as illustrated in FIG. 1 includes a base station control unit 18 and an antenna tower (not shown).

The control unit 18 comprises the base station electronics and is usually positioned within a ruggedized enclosure at, or near, the base of the tower. The control unit 18 is coupled to the switching office through land lines or, alternatively, the signals might be transmitted or backhauled through microwave backhaul antennas. A typical cellular network may comprise hundreds of base stations 14, thousands of mobile units or units 12 and one or more switching offices 16.

The switching office 16 is the central coordinating element of the overall cellular network. It typically includes a cellular processor, a cellular switch and also provides the interface to the public switched telephone network (PTSN). Through the cellular network, a duplex radio communication link may be established between users of the cellular network.

One or more passive antennas 20 are supported on the tower, such as at the tower top 22, and are oriented about the tower top 22 to provide the desired beam sectors for the cell. A base station will typically have three or more RF antennas and one or more backhaul antennas associated with each wireless service provider using the base station. The passive RF antennas 20 are coupled to the base station control unit 18 through multiple RF coaxial cables 24 that extend up the tower and provide transmission lines for the RF signals communicated between the passive RF antennas 20 and the control unit 18 during transmit ("down-link") and receive ("up-link") cycles.

The typical base station 14 as in the prior art of FIG. 1 requires amplification of the RF signals being transmitted by the RF antenna 20. For this purpose, it has been conventional to use a large linear power amplifier (not shown) within the control unit 18 at the base of the tower or other support structure. The linear power amplifier must be cascaded into high power circuits to achieve the desired linearity at the higher output power. Typically, for such high power systems or amplifiers, additional high power combiners must be used at the antennas 20 which add cost and complexity to the passive antenna design. The power losses experienced in the RF coaxial cables 24 and through the power splitting at the tower top 22 may necessitate increases in the power amplification to achieve the desired power output at the passive antennas 20, thereby reducing overall operating efficiency of the base station 14. It is not uncommon that almost half of the RF power delivered to the passive antennas 20 is lost through the cable and power splitting losses.

The RF cables 24 extending up the tower present structural concerns as well. The cables 24 add weight to the tower which much be supported, especially when they become ice covered, thereby requiring a tower structure of sufficient size and strength. Moreover, the RF cables 24 may present windloading problems to the tower structure, particularly in high winds.

Typical base stations also have antennas which are not particularly adaptable. That is, generally, the antennas will provide a beam having a predetermined beam width, azimuth and elevation. Of late, it has become more desirable from a standpoint of a wireless service provider to achieve adaptability with respect to the shape and direction of the beam from the base station.

Therefore, there is a need for a base station and antennas in a wireless communication system that are less susceptible to cable losses and power splitting losses between the control unit and the antennas.

There is also a need for a base station and associated antennas that operate efficiently while providing a linearized output during a transmit cycle.

It is further desirable to provide antennas which address such issues and which may be used for forming beams of a particular shape and direction.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 2:
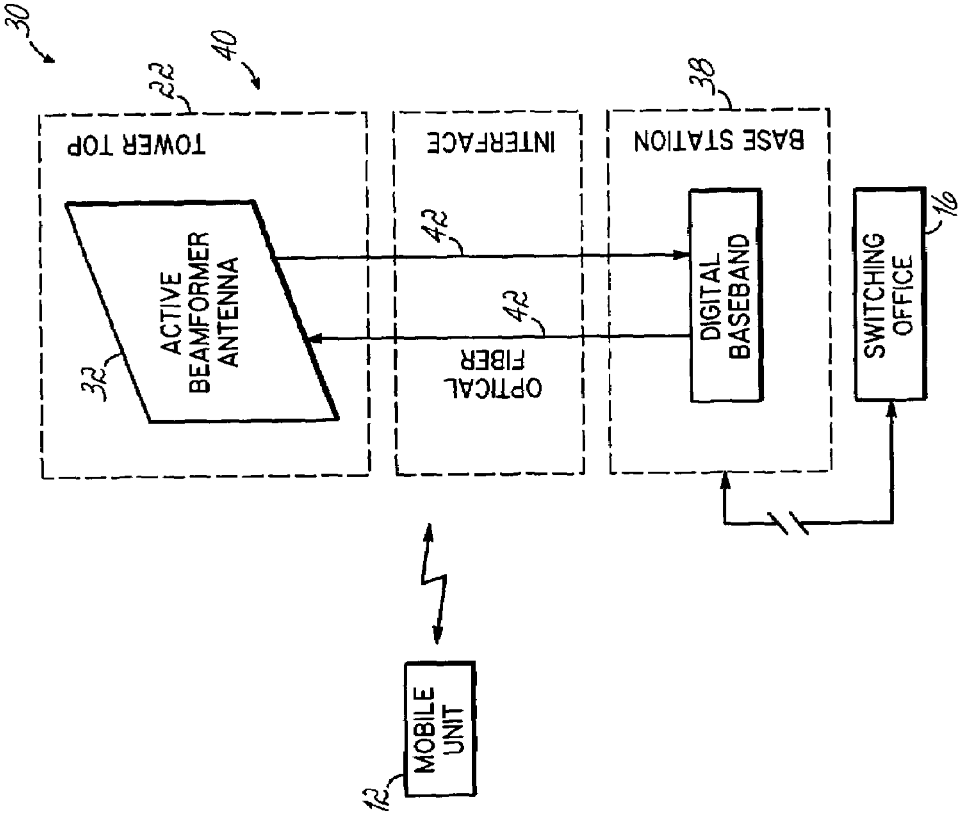
FIG. 2 is a schematic block diagram illustrating the basic components of a cellular communication system in accordance with the principles of the present invention.
Figure 1:
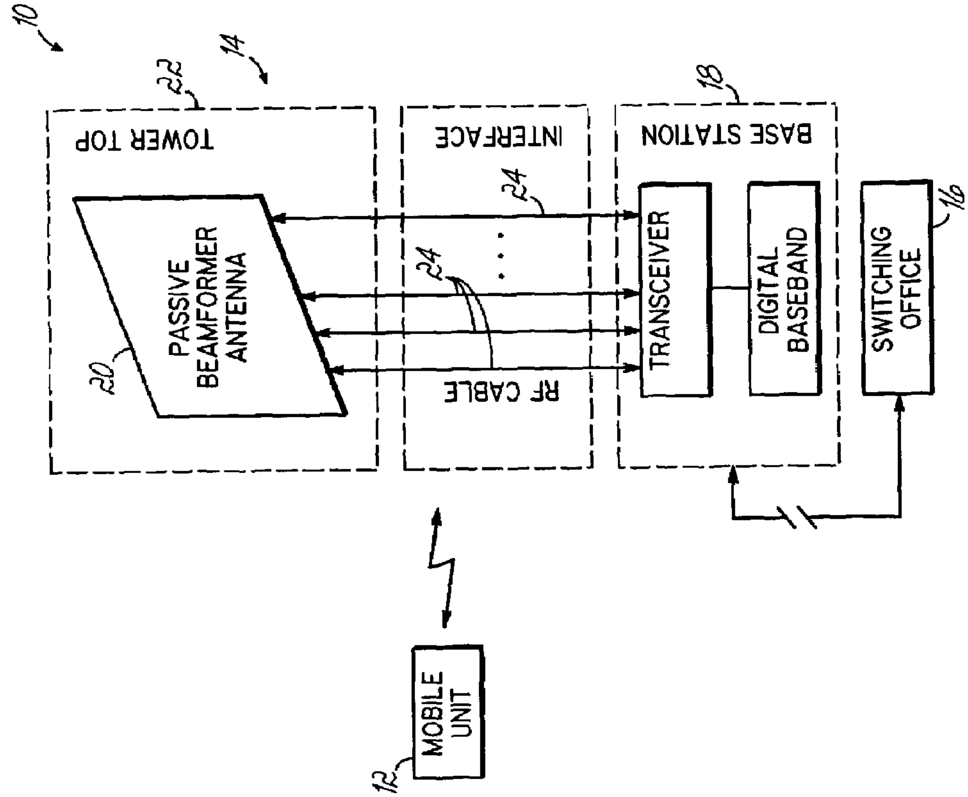
FIG. 1 PRIOR ART
FIG. 1 is a schematic block diagram illustrating the basic components of a cellular communication system in accordance with the prior art.
Figure 7:
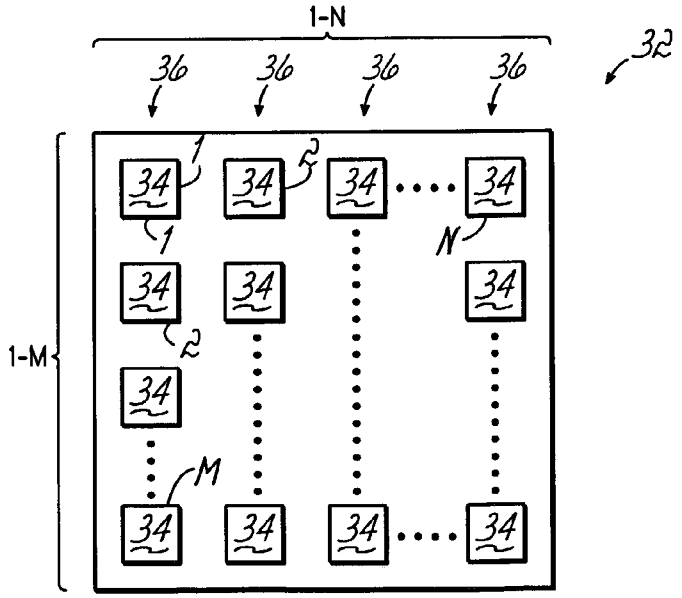
FIG. 7 is a schematic diagram of a planar antenna array in accordance with the principles of the present invention.

Referring now to the Figures, and to FIG. 2 in particular, a wireless communication system 30 in accordance with the principles of the present invention is shown, where like numerals represent like parts to the cellular communication system 10 of FIG. 1. As will be described in greater detail below, wireless communication system 30 is a digitally adaptive beamforming antenna system having multiple M×N active antenna arrays 32 supported on a tower, such as on the tower top 22, which are oriented about the tower top 22 to provide the desired beam sectors for a defined cell. As shown in FIG. 7, each active antenna array 32 comprises an array of antenna elements 34 which are arranged generally in a desired pattern, such as a plurality of N vertical columns or sub-arrays 36 (designated 1–N) with M antenna elements 34 per column (designated 1–M). The M×N array 32 of antenna elements 34 may be formed by suitable techniques, such as by providing strip line elements or patch elements on a suitable substrate and ground plane, for example. Of course, other configurations of the array 32 are possible as well without departing from the spirit and scope of the present invention. The array of antenna elements 34 are operable to define multiple, individual beams for signals in one or more communication frequency bands as discussed below.

Utilizing the array of elements 34, a beam, or preferably a number of beams, may be formed having desired shapes and directions. Beamforming with an antenna array is a known technique. In accordance with the principles of the present invention, the beam or beams formed by the active antenna array 32 are digitally adaptive for a desired shape, elevation and azimuth. The antenna array 32 is preferably driven to adaptively and selectively steer the beams as desired for the cell.

Individually manipulating the signals to each antenna element 34 allows beam steering and in both azimuth and elevation. Alternatively, azimuth beam steering may be more desirable than elevation beam steering, and therefore individual signals to vertical columns or sub-arrays 36 (designated 1-N) are manipulated to achieve azimuth steering. That is, the individual columns are manipulated to provide beams which may be steered in azimuth while having a generally fixed elevation.

Further referring to FIG. 2, a base station control unit 38 of base station 40 is mounted at or near the base of the antenna tower (not shown) and is operable to transmit signals to and receive signals from each planar antenna array 32 in digital baseband. One or more transmission lines 42, such as optical fiber cables in one embodiment, are coupled to the base station control unit 38 and each planar antenna array 32 for transmission of digital baseband signals therebetween. The fiber optic cables 42 of the present invention extend up the tower and replace the large coaxial RF cables 24 of the prior art (FIG. 1) and significantly reduce the expense, weight and windloading concerns presented by the prior RF cables.

Figure 3:
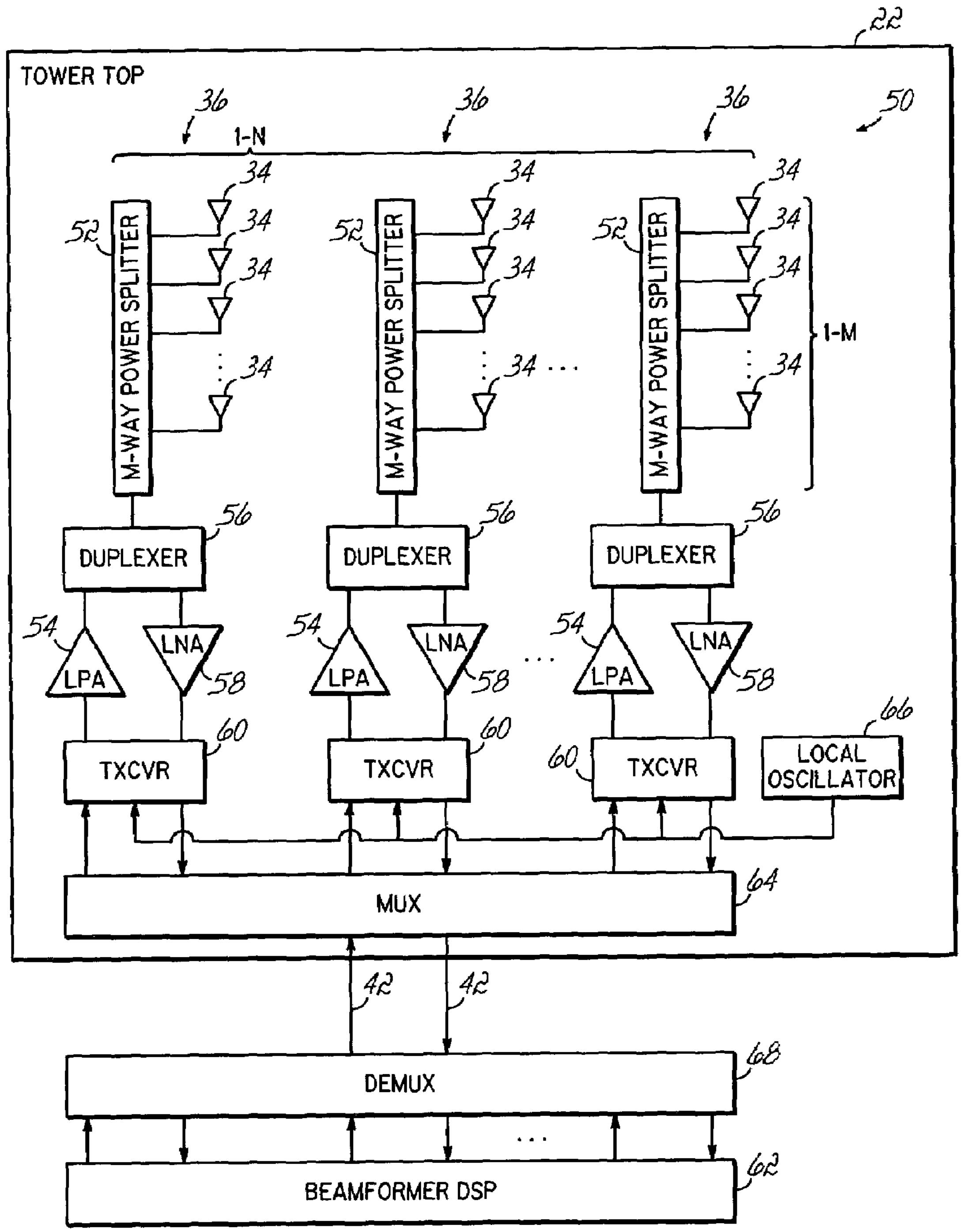
FIG. 3 is a schematic block diagram of an antenna system for use in the cellular communication system of FIG. 2 in accordance with one aspect of the present invention.

Referring now to FIG. 3, an active antenna array 50 is shown in accordance with one embodiment of the present invention. As described in detail above, the antenna elements 34 may be arranged generally in a pattern including a plurality of N vertical columns or sub-arrays 36 (designated 1-N) with M antenna elements 34 per column (designated 1-M). Each antenna element 34 of each column or sub-array 36 is coupled to an M-way power splitter 52. In accordance with one aspect of the present invention, a multicarrier linear power amplifier (LPA) 54 is operatively coupled to an input of each vertical column 36 to operatively couple with the antenna elements 34 of the respective column. In one embodiment of the present invention, the antenna elements 34 are common antenna elements that perform both transmit and receive functions. With the antenna 50, all antenna elements 34 are configured to simultaneously transmit radio signals to the mobile stations or units 12 (referred to as "down-linking") and receive radio signals from the mobile stations or units 12 (referred to as "up-linking"). A duplexer 56 is operatively coupled to the input of each vertical column 36 to facilitate simultaneous transmit and receive functionality for that column array.

The multicarrier linear power amplifiers 54 are provided in the active antenna array 50 and eliminate the high amplifying power required in cellular base stations of the prior art which have large power amplifiers located at the base of the tower. By moving the transmit path amplification to the antenna arrays 50 at the tower top 22, the significant cable losses and splitting losses associated with the passive antenna systems of the prior art are reduced. The multicarrier linear power amplifiers 54 of the present invention support multiple carrier frequencies and provide a linearized output to the desired radiated power without violating spectral growth specifications. Each multicarrier linear power amplifier 54 may incorporate feedforward, feedback or any other suitable linearization circuitry either as part of the multicarrier linear power amplifier 54 or remote therefrom to reduce or eliminate intermodulation distortion at the outputs of the antenna elements 34. Incorporating multicarrier linear power amplifiers 34 at the input to each vertical column 36 mitigates signal power losses incurred getting up the tower and therefore improves antenna system efficiency over passive antenna systems of the prior art.

Further referring to FIG. 3, and in accordance with another aspect of the present invention, a low noise amplifier (LNA) 58 is operatively coupled to the output of each vertical column 36 to operatively couple with the antenna elements 34. The low noise amplifiers 58 are provided in the active antenna array 50 to improve receiver noise figure and sensitivity for the system.

In accordance with yet another aspect of the present invention, as illustrated in FIG. 3, each planar antenna array 50 incorporates a transceiver 60 operatively coupled to each vertical column or sub-array 36. Each transceiver 60 is operable to convert the digital baseband signals from a beamformer DSP 62 of the control unit 38 to RF signals for transmission by the antenna elements 34 during a "down-link". The transceivers 60 are further operable to convert RF signals received by the antenna elements 34 during an "up-link". The transceivers 60 are each coupled to the optical fiber transmission lines 42 through a multiplexer or MUX 64 and are driven by a suitable local oscillator (LO) 66. A demultiplexer or DEMUX is coupled to the beamformer DSP 62 and is further coupled to the MUX 64 through the optical fiber transmission lines 42. Generally, the transceivers 60 convert the down-link signals to a form which may be readily processed by various digital signal processing (DSP) techniques, such as channel digital signal processing, including time division techniques (TDMA) and code division techniques (CDMA). The digital signals, at that point, are in a defined digital band which is associated with the antenna signals and a communication frequency band.

Figure 4:
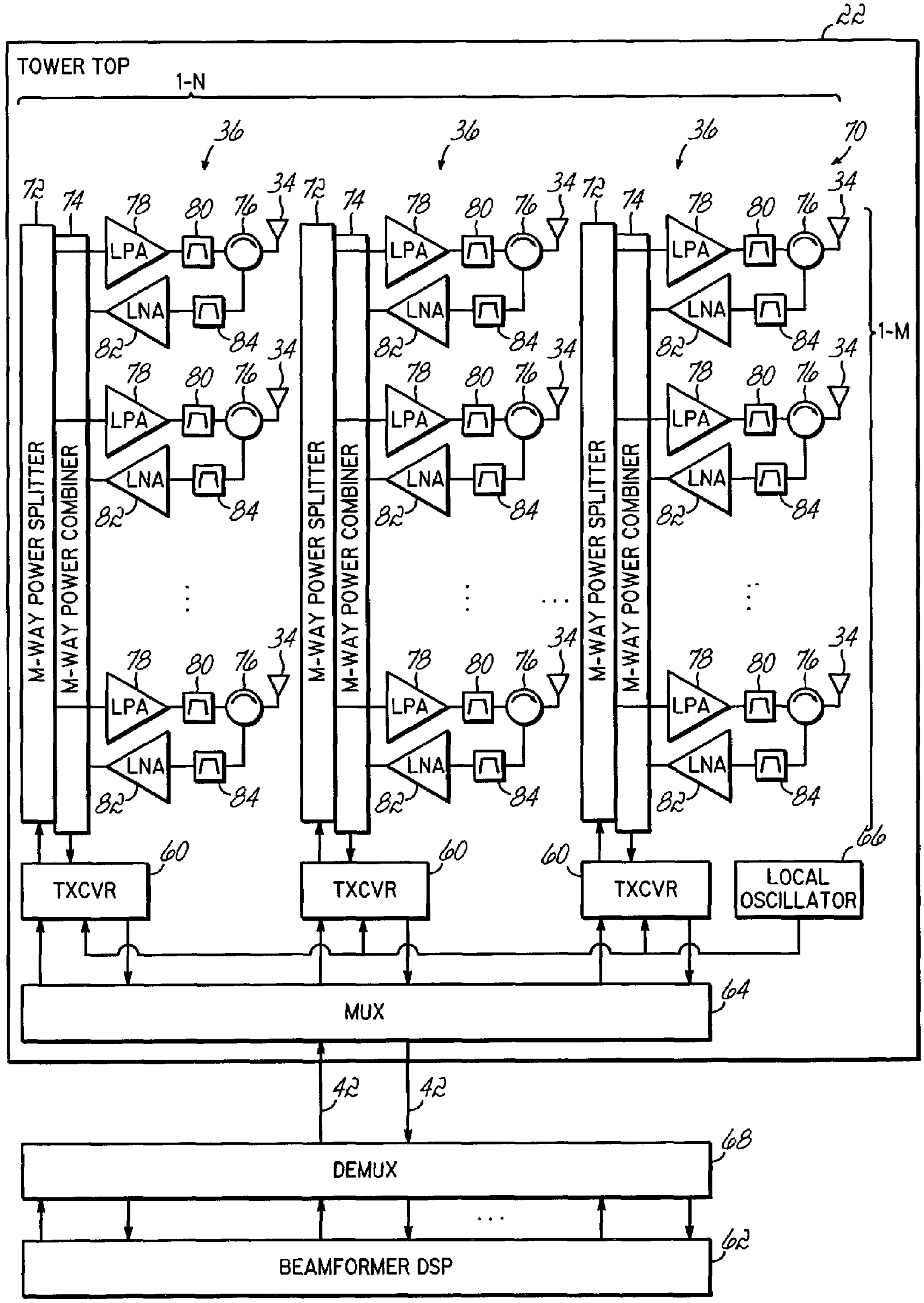
FIG. 4 is a schematic block diagram of an antenna system for use in the cellular communication system of FIG. 2 in accordance with another aspect of the present invention.

Now referring to FIG. 4, a distributed active antenna array 70 in accordance with another aspect of the present invention is illustrated, where like numerals represent like elements to the planar antenna array 50 of FIG. 3. In this embodiment, each antenna element 34 is operatively coupled to an M-way power splitter 72 and to an M-way power combiner 74. With the antenna 70, all antenna elements 34 are configured to simultaneously transmit radio signals to the mobile stations or units 12 and receive radio signals from the mobile stations or units 12. A circulator 76 is operatively coupled to each antenna element 34 to facilitate simultaneous transmit and receive functionality. A multicarrier linear power amplifier 78 is provided at or near each antenna element 34 in the transmit path with suitable filtering provided by a filter 80 at the output of each multicarrier linear power amplifier 78. Incorporating multicarrier linear power amplifiers 78 before each antenna element 34 in the planar array 70 offsets insertion losses due to imperfect power splitting in the antenna 70. Furthermore, incorporating a multicarrier linear power amplifier 78 with each antenna element 34 permits power splitting at low power levels. The N×M planar antenna 70 requires N×M multicarrier linear power amplifiers 78 each of which can be simple and small since the total power of each is approximately given by:

$$P_{outi} \approx \frac{P_{total}}{N \times M}$$

where $P_{out}$, is the required power output of each multicarrier linear power amplifier 78, $P_{total}$ is the total required power output of the planar antenna array 70, and N×M is the number of multicarrier linear power amplifiers 78 incorporated in the planar antenna array 70. Because the multicarrier linear power amplifiers 78 do not encounter cable losses up the tower or splitting losses to each antenna element 34, the efficiency of the antenna array 70 is improved over passive antenna designs of the prior art.

Further referring to FIG. 4, a low noise amplifier (LNA) 82 is provided at or near each antenna element 34 in the receive path with suitable filtering provided by a filter 84 at the input of each low noise power amplifier 82. The low noise amplifiers 82 are provided in the active antenna array 70 to improve the receiver noise figure and sensitivity.

Figure 5:
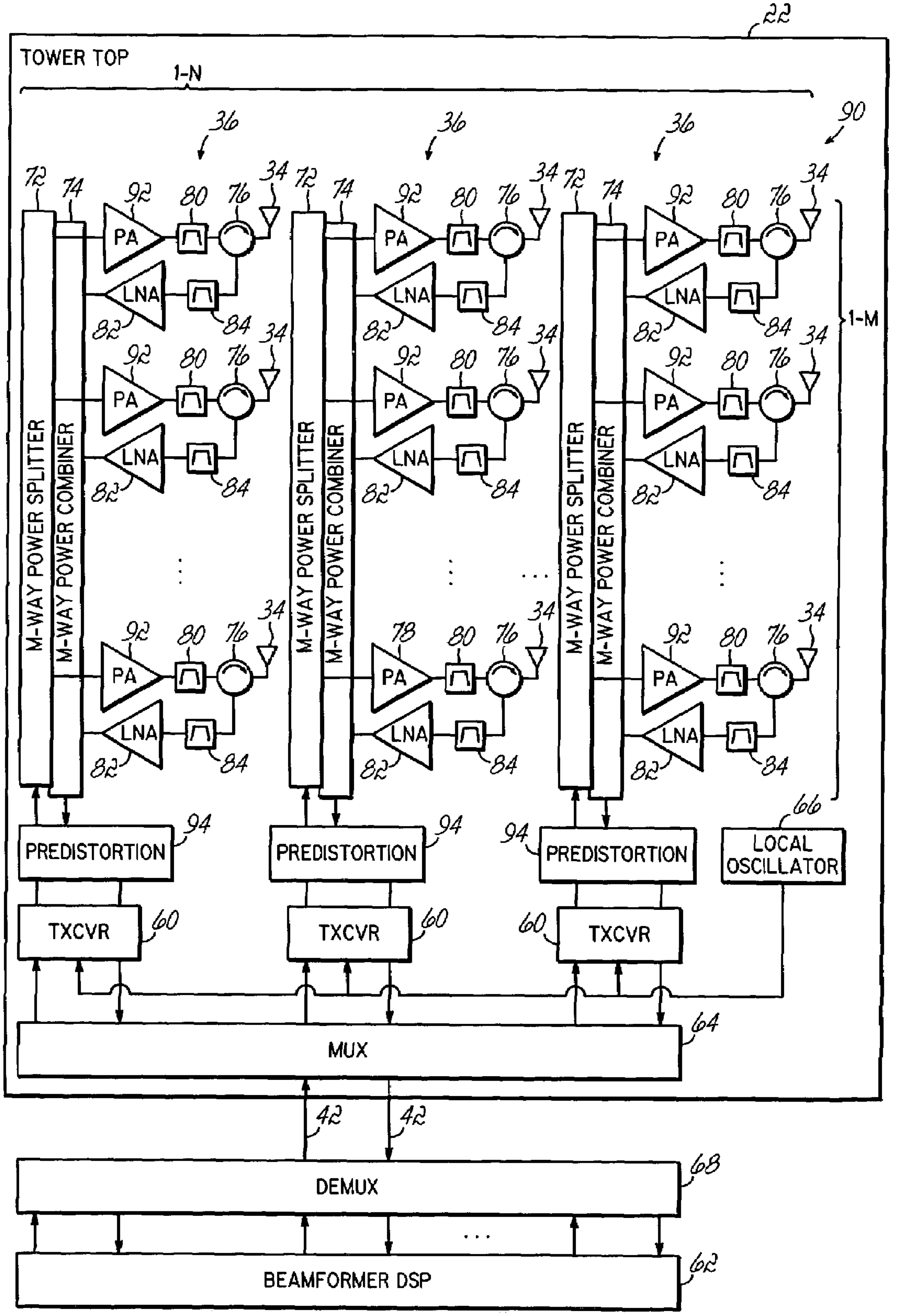
FIG. 5 is a schematic block diagram of an antenna system for use in the cellular communication system of FIG. 2 in accordance with yet another aspect of the present invention.

FIG. 5 illustrates a distributed active antenna array 90 in accordance with yet another aspect of the present invention and is somewhat similar in configuration to the planar antenna array 70 of FIG. 4, where like numerals represent like elements. In this embodiment, the multicarrier linear power amplifiers 78 coupled to each of the antenna elements as illustrated in FIG. 4 are replaced with multicarrier power amplifiers (PA) 92. Linearization of the outputs of antenna elements 34 is provided by predistortion circuits 94 that are each operatively coupled to an input of a respective vertical column or sub-array 36. As will be described in detail below, the predistortion circuits 94 are operable to reduce or eliminate generation of intermodulation distortion at the outputs of the antenna elements 34 so that a linearized output is achieved.

Figure 6A:
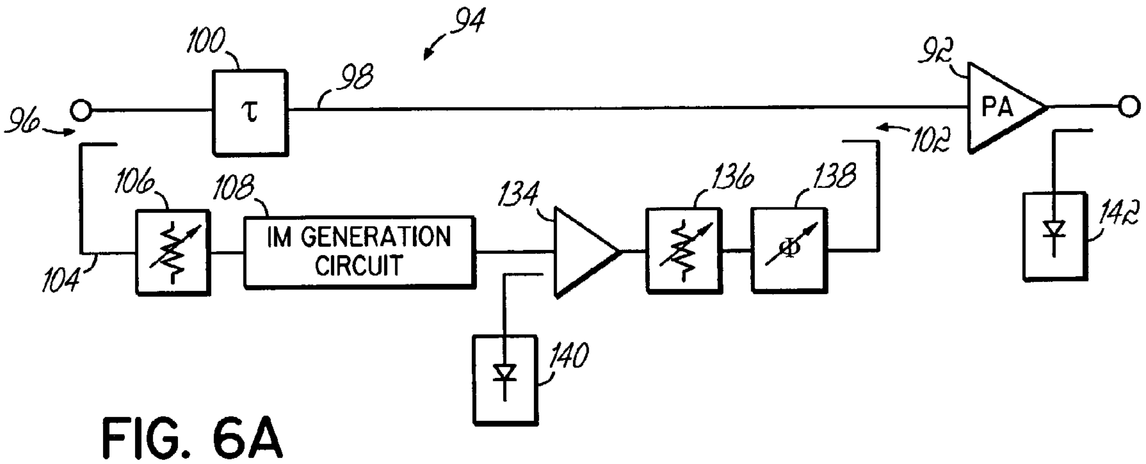
FIG. 6A is a schematic block diagram of a predistortion circuit in accordance with the principles of the present invention for use in the antenna system of FIG. 5.

Referring now to FIG. 6A, the predistortion circuit 94 receives the RF carrier signal from the transceivers 60 at its input 96.

Along the top path 98, the carrier signal is delayed by a delay circuit 100 between the input 96 and an output 102. Part of the RF carrier signal energy is coupled off at the input 96 for transmission through a bottom intermodulation (IM) generation path 104. An adjustable attenuator 106 is provided at the input of an intermodulation (IM) generation circuit 108 to adjust the level of the coupled RF carrier signal prior to being applied to the intermodulation (IM) generation circuit 108.

Figure 6B:
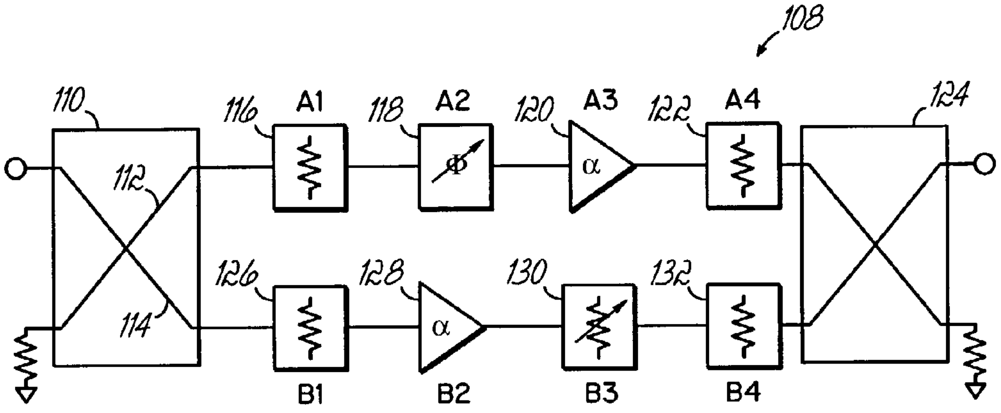
FIG. 6B is a schematic block diagram of an intermodulation generation circuit for use in the predistortion circuit of FIG. 6A.

The intermodulation (IM) generation circuit 108 is illustrated in FIG. 6B and includes a 90° hybrid coupler 110 that splits the RF carrier signal into two signals that are applied to an RF carrier signal path 112 and to an intermodulation (IM) generation path 114. In the RF carrier signal path 112, the RF carrier signal is attenuated by fixed attenuator 116 of a sufficient value, such as a 10 dB attenuator, to ensure that no intermodulation products are generated in amplifier 120. The signal is further phase adjusted by variable phase adjuster 118. The attenuated and phase adjusted RF carrier signal is amplified by amplifier 120, but do to the attenuation of the signal, the amplifier 120 does not generate any intermodulation (IM) products at its output so that the output of the amplifier 120 is the RF carrier signal without intermodulation (IM) products.

The RF carrier signal in the RF carrier signal path 112 is attenuated by fixed attenuator 122 and applied to a second 90° hybrid coupler 124.

Further referring to FIG. 6*b*, in the intermodulation (IM) generation path 114, the RF carrier signal is slightly attenuated by a fixed attenuator 126, such as a 0-1 dB attenuator, and then applied to an amplifier 128. In another aspect of the present invention, the amplifier 128 has a similar or essentially the same transfer function as the transfer function of the multicarrier power amplifier 92 coupled to the antenna elements 34 and so will generate a similar or the same third, fifth and seventh order intermodulation (IM) products as the multicarrier power amplifiers 92 used in the final stage of the transmit paths. The amplifier 128 amplifies the RF carrier signal and generates intermodulation (IM) products at its output. The amplified RF carrier signal and intermodulation (IM) product are then applied to a variable gain circuit 130 and a fixed attenuator 132. The phase adjustment of the RF carrier signal by the variable phase adjuster 118 in the RF carrier signal path 112, and the gain of the RF carrier signal and intermodulation (IM) products by the variable gain circuit 130 in the intermodulation (IM) generation path 114, are both adjusted so that the RF carrier signal is removed at the summation of the signals at the second hybrid coupler 124 and only the intermodulation (IM) products remain in the intermodulation (IM) generation path 114.

Referring now back to FIG. 6A, the intermodulation (IM) products generated by the intermodulation (IM) generation circuit 108 of FIG. 6B are amplified by amplifier 134 and then applied to a variable gain circuit 136 and variable phase adjuster 138 prior to summation at the output 102. The RF carrier signal in the top path 98 and the intermodulation (IM) products in the intermodulation (IM) generation path 104 are 180° out of phase with each other so that the summation at the output 102 comprises the RF carrier signal and the intermodulation (IM) products 180° out of phase with the RF carrier signal.

The signal of the combined RF carrier and out of phase intermodulation (IM) products is applied to the multicarrier power amplifiers 92 coupled to each antenna element 34 at the final stages of the transmit paths. The RF carrier signal is amplified and intermodulation (IM) products are generated by the amplification. The combined (IM) products and out of phase IM products at the output of the multicarrier power amplifiers 92 provides a significant reduction/cancellation of the (IM) distortion at the amplifier outputs.

Further referring to FIG. 6A, a carrier cancellation detector 140 is provided at the output of the intermodulation (IM) generation circuit 108 to monitor for the presence of the RF carrier signal at the output. If the RF carrier signal is detected, the carrier cancellation detector 140 adjusts the variable phase adjuster 118 and the variable gain circuit 130 of the intermodulation (IM) generation circuit 108 until the RF carrier signal is canceled at the output of the intermodulation (IM) generation circuit 108. An intermodulation (IM) cancellation detector 142 is provided at the output of each multicarrier power amplifier (PA) 92. If intermodulation (IM) products are detected, the intermodulation (IM) cancellation detector 142 adjusts the variable gain circuit 136 and variable phase adjuster 138 in the bottom intermodulation (IM) generation path 104 until the intermodulation (IM) products are canceled at the outputs of the multicarrier power amplifiers 92. In this way, the predistortion circuits 94 suppress generation of intermodulation (IM) products by the multicarrier power amplifiers 92 so that the outputs of the antenna elements 34 are linearized.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

The invention claimed is:

1. An active beamforming antenna, comprising:

an array of antenna elements arranged in a plurality of sub-arrays to define the array;

a plurality of power splitters, each power splitter being associated with a respective one of the plurality of sub-arrays and having an input and a plurality of outputs;

a plurality of multicarrier power amplifiers, each multiplier power amplifier being operatively coupled to a respective one of the outputs of the power splitters and a respective one of the antenna elements of the array; and a plurality of predistortion circuits, each predistortion circuit being associated with a respective one of the sub-arrays and operatively coupled to a respective one of the inputs of the power splitters to operatively couple with the antenna elements, the predistortion circuit being capable to suppress generation of intermodulation distortion.

2. The beamforming antenna of claim 1, further comprising:

a plurality of power combiners, each power combiner being associated with a respective one of the sub-arrays and having a plurality of inputs and an output; and a plurality of low noise amplifiers, each of the noise amplifiers being operatively couple to a respective one of the inputs of the power combiners and a respective one of the antenna elements of the array.

3. The beamforming antenna of claim 1 further comprising a circulator operatively coupled to the antenna elements to facilitate simultaneous transmit and receive functionality.

4. The beamforming antenna of claim 1 wherein each predistortion circuit has a transfer function similar to a transfer function of the multicarrier power amplifiers.

5. A base station, comprising:

a tower;

an antenna supported on the tower and having an array of antenna elements arranged in one or more sub-arrays to define the array;

a power splitter associated with each sub-array and having an input and a plurality of outputs;

a plurality of multicarrier power amplifiers, each multicarrier power amplifier being coupled to a respective one of the outputs of the power splitter and a respective one of the antenna elements of the sub-array;

a control unit associated with the tower and operable to transmit signals to and receive signals from the antenna in digital baseband;

a transceiver operatively coupled to each sub-array and being operable to convert between digital baseband signals and RF signals between the antenna array and control unit; and a predistortion circuit associated with each sub-array and being coupled to the transceiver and to the input of the power splitter, the predistortion circuit being capable to suppress generation of intermodulation distortion at the antenna.

6. The base station of claim 5, further comprising at least one fiber optic transmission line coupled to the control unit and the antenna for transmission of the digital baseband signals therebetween.

7. The base station of claim 5, further comprising:

a power combiner associated with each sub-array and having a plurality of inputs and an output;

a low noise amplifier operatively coupled to a respective one of the inputs of the power combiner and a respective one of the antenna elements of the sub-array.

8. The base station of claim 7, wherein each low noise amplifier is operatively coupled proximate each antenna element of the array.

9. The base station of claim 5, further comprising a duplexer operatively coupled to the antenna elements to facilitate simultaneous transmit and receive functionality.

10. The base station of claim 5, further comprising a circulator operatively coupled to the antenna elements to facilitate simultaneous transmit and receive functionality.

11. The beamforming antenna of claim 5 wherein the predistortion circuit has a transfer function similar to a transfer function of the multicarrier power amplifiers.

12. A method of forming a beam at an antenna having an array of antenna elements arranged in a plurality of sub-arrays to define the array, comprising:

providing a plurality of power splitters, each power splitter being associated with a respective one of the sub-arrays and having an input and a plurality of outputs;

providing a plurality of multicarrier power amplifiers; and operatively coupling each multicarrier power amplifier to a respective one of the outputs of the power splitters and a respective one of the antenna elements of the array;

providing a plurality of predistortion circuits, each predistortion circuit being associated with a respective one of the sub-arrays;

operatively coupling each predistortion circuit to a respective one of the inputs of the power splitters to operatively couple with the antenna elements, the predistortion circuit being capable to suppress generation of intermodulation products.

13. The method of claim 12, further comprising the steps of:

providing a plurality of power combiners, each power combiner being associated with a respective one of the sub-arrays and having a plurality of inputs and an output;

providing a plurality of low noise amplifiers; and operatively coupling each low noise amplifier to a respective one of the inputs of the power combiners and a respective one of the antenna elements of the array.

14. The method of claim 12 wherein each predistortion circuit has a transfer function similar to a transfer function of the multicarrier power amplifiers.

* * * * *

UNITED STATES PATENT AND TRADEMARK OFFICE

CERTIFICATE OF CORRECTION

PATENT NO. : 7,280,848 B2
APPLICATION NO. : 10/260797
DATED : October 9, 2007
INVENTOR(S) : Russell Hoppenstein It is certified that error appears in the above-identified patent and that said Letters Patent is hereby corrected as shown below:

In column 3, line 19, change “The array of antenna elements 34 are” to --The array of antenna elements 34 is--.

In column 5, line 24, change “where $P_{out,}$ is the required power output” to --where $P_{out\ i}$ is the required power output--.

In column 6, line 8, change “but do to the attenuation” to --but due to the attenuation--.

In column 7, line 12, change “intention of the applicants to” to --intention of the applicant to--.

In claim 1, column 7, line 28, change “each multi-plier power amplifier” to --each multicarrier power amplifier--.

Signed and Sealed this

Twenty-fourth Day of June, 2008

JON W. DUDAS
*Director of the United States Patent and Trademark Office*